Patented Aug. 15, 1950

2,518,573

UNITED STATES PATENT OFFICE 2,518,573

POLYMERIZATION OF 1,3-DIENES IN THE PRESENCE OF BETA-UNSATURATED ALIPHATIC IODIDES

George W. Scott, Wilmington, Del., assignor to E. I. du Pont de Nemours & Company, Wilmington, Del., a corporation of Delaware No Drawing. Application May 23, 1946, Serial No. 671,914

11 Claims. (Cl. 260—92.3)

This invention relates to an improved method of modifying the polymerization of 1,3-dienes and interpolymerization of the same with mono-olefinic polymerizable compounds, and to new and improved polymers produced thereby.

In the polymerization of 1,3-dienes in the absence of modifying agents, polymers are obtained normally which are tough and dry and which are therefore difficult or impossible to handle in the usual types of rubber processing machinery. Modifying agents are therefore usually employed to give polymers which are soft and which are readily processable or which can be made soft and readily processable by mechanical working or by the addition of small amounts of peptizing agents (chemical softeners). The commonly used modifying agents are sulfur, or sulfur-containing substances such as mercaptans, which are employed usually in amounts up to 2% of the weight of the polymers. In addition to its modifying effect, sulfur, when present during the polymerization, particularly of chloroprene, improves the physical properties of films of the polymers deposited directly from their aqueous dispersions. In general, the improved plasticity of the synthetic rubbers of the 1,3-diene types is obtained by the addition of reagents which ordinarily retard polymerization, such as sulfur or sulfur compounds, and therefore it has been necessary to employ with these modifying agents catalysts or accelerators which increase the rate of polymerization.

Sulfur and sulfur-containing compounds often render synthetic elastomers unsuitable for certain uses because of the presence of the sulfur in the finished elastomer, and usually they impart to the elastomer an odor which, in many cases, is undesirable. It is therefore desirable that modifiers for 1,3-diene-type elastomers be produced which do not impart to the synthetic elastomers the objectionable properties imparted thereto by the sulfur or sulfur-containing compounds and which are free from the metal compounds often required to effect polymerization when sulfur or sulfur compounds are used as modifying agents.

It is therefore an object of this invention to provide a method for modifying the polymerization and interpolymerization of 1,3-dienes which will not introduce sulfur into the resulting polymer, making possible the production of sulfur-free elastomers. It is a further object of the invention to provide a process for producing chloroprene and butadiene polymers which have improved storage stability, flatter curing range and better resistance to heat aging, and to cut growth, than are normally obtained by the use of sulfur modifying agents. It is a further object of the invention to provide a process for the polymerization of 1,3-dienes which will permit a more rapid polymerization than when sulfur or sulfur-containing compounds are employed, thereby resulting in increased production and/or decrease in the amount of polymerization catalyst needed to carry out the process. A still further object is to provide a process for producing polymers of 1,3-dienes which have improved working properties and which result in more stable latices because of the lower concentration of electrolytes present therein, and one which produces polymers of 1,3-dienes free from the objectionable odor associated with sulfur compounds. Another object of the invention is to provide a method of modifying the polymerization and interpolymerization of 1,3-dienes with agents which, when used in only relatively small amounts, give plastic polymers particularly suitable for use in cements of low viscosity and high solids content.

I have found that the objects as above set forth can be accomplished by carrying out the polymerization of 1,3-dienes, such as 1,3-butadiene and 2-chloro-1,3-butadiene, or the interpolymerization of these dienes with each other or with mono-olefinic polymerizable materials in the presence of small amounts of aliphatic iodo compounds which contain the nucleus:

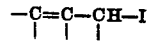

which compounds contain not more than 8 carbon atoms in the aliphatic chain and which are straight chain aliphatic compounds. As illustrative of the class of compounds which I have found useful in carrying out this invention, are 1-iodopropene-2 (allyl iodide), 1-iodopentene-2, 2-iodobutene-3, 3-iodopentene-4, 1-iodohexadiene-2,4, 1-iodoheptadiene-2,4, 1-iodo-3-chlorobutene-2, 1-iodo-2-chlorobutene-2, 1-chloro-3-iodobutene-1, 1-iodo-3-chlorohexadiene-2,4, 1,4-diiodobutene-2, 1-iodo-3-bromobutene-2. This class of compounds may be referred to generally as mono- and di-halogen substituted straight chain unsaturated aliphatic compounds selected from the group consisting of the mono-olefine and di-olefine series containing not more than 8 carbon atoms and having the nucleus

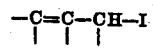

in which each carbon atom carries no more than one halogen atom. The preferred group of compounds within the class are those which contain the primary iodide group —CH₂—I. 1-iodo-3-chlorobutene-2 is especially preferred.

The 1-iodo-3-chlorobutene-2 mentioned above may be prepared as follows: 50 parts of 1,3-dichlorobutene-2 and 60 parts of sodium iodide are dissolved in 163 parts of ethyl alcohol (95%) and allowed to stand at room temperature for one hour. The precipitated sodium chloride is filtered from the alcoholic solution, which is then poured into water. The water-insoluble oil which separates is washed with a 1% solution of sodium thiosulfate to remove traces of free iodine. The resulting light yellow liquid of penetrating odor was 1-iodo-3-chlorobutene-2 containing total halogen 43.1% and iodine 52.3%.

The following examples are given to illustrate the invention. The parts used are by weight, unless otherwise specified.

*Example 1*

Chloroprene was polymerized in an emulsion at 40° C., using the following recipe, the modifying agent and rosin being first dissolved in the chloroprene, which was then emulsified in the water containing the other ingredients.

| | Parts |
|---|---|
| Chloroprene | 100 |
| Water | 147.5 |
| Dispersing agent¹ | 0.75 |
| Nancy wood rosin | 4.0 |
| Sodium hydroxide | 0.9 |
| Potassium persulfate | 0.6 |
| Modifying agent | As indicated |

¹ Sodium salt of the reaction product of naphthalene, sulfuric acid and formaldehyde.

In each case, the polymerization was stopped when the emulsion reached a specific gravity of 1.057 to 1.058 by the addition of 2.5 parts of tetraethyl thiuram disulfide dispersed in water. The emulsion was coagulated by freezing in thin layers and the polymer was washed with water, dried with warm air, and milled. The resulting data are tabulated below:

| Modifying Agent | Per Cent Yield | Williams¹ Plasticity Number | Recovery | Millability² |
|---|---|---|---|---|
| None | 85 | 346 | 184 | Very poor. |
| 1.0 part allyl iodide | 88 | 72 | 1 | Excellent. |
| 0.25 part 1-iodo-3-chlorobutene-2 | 84 | 90 | 4 | Do. |
| 0.50 part 1-iodo-3-chlorohexadiene-2,4 | 96 | 104 | 24 | Good. |
| 0.60 part 1,4-di-iodo-butene-2³ | 87 | 86 | 7 | Excellent. |

¹ Based on method described by Williams, Ind. Eng. Chem. 16, 362 (1924). The lower numbers represent the greater plasticities.
² Very poor = tough polymer which fails to band on a mill.
Good = polymer which forms a coherent band on the mill, making compounding possible.
Excellent = polymer which forms a smooth continuous band on the mill.
³ The recipe used in preparing this polymer contained a dehydrogenated rosin and 1.0 part of potassium persulfate in place of the Nancy wood rosin and 0.6 part of potassium persulfate.

This example shows that allylic iodides are very effective modifying agents for chloroprene polymerization.

*Example 2*

A series of polymers was prepared as in Example 1, in order to study the effect of concentration of one of these modifying agents, 1-iodo-3-chlorobutene-2, on the degree of modification.

| Parts of 1-Iodo-3-Chlorobutene-2 | Percent Yield | Williams Plasticity Number | Recovery | Description of Polymer |
|---|---|---|---|---|
| 0 | 85 | 346 | 184 | Tough and dry. |
| ¹0.125 | 88 | 181 | 174 | Do. |
| ²0.175 | 86.5 | 134 | 79 | Well plasticized and good milling. |
| 0.25 | 84 | 90 | 4 | Soft and slightly tacky. |
| 0.50 | 82 | | | Extremely soft and tacky. |

¹ Only 0.1 part potassium persulfate used in the emulsion recipe.
² Only 0.3 part potassium persulfate used in the emulsion recipe.

This example shows that these allylic iodides are effective at very low concentrations for producing substantial modification of chloroprene, with small variations in concentration resulting in polymers of quite different physical properties. The soft polymers prepared with the higher concentrations of 1-iodo-3-chlorobutene-2 are very effective for producing low viscosity cements with high solids content.

*Example 3*

Polymers prepared with allylic iodides as modifying agents give vulcanizates which have high tensile strength and good elongation at break. These polymers are compared to sulfur modified polymer in the following tread stock. The polymers containing the iodides used for this comparison were made according to Example 1, except for the use of less allyl iodide, as shown.

| | Parts |
|---|---|
| Polymer | 100 |
| Phenyl-alpha-naphthylamine | 2 |
| MPC black | 36 |
| Magnesium oxide | 4 |
| Zinc oxide | 5 |

| Modifying Agent | Cure | 300% Modulus (lb./sq. in.) | Tensile Strength (lbs./sq. in.) | Elong. at Break, Per Cent |
|---|---|---|---|---|
| 0.25 part 1-iodo-3-chlorobutene-2 | 30 min. at 287° F | 1,220 | 4,060 | 640 |
| 0.25 part Allyl iodide | 30 min. at 287° F | 1,360 | 4,150 | 590 |
| 0.60 part Sulfur | 15 min. at 287° F | 1,140 | 3,520 | 650 |

*Example 4*

This illustrates the use of 1-iodo-3-chlorobutene in the polymerization of chloroprene in acidic emulsions. Choloroprene was polymerized at 40° C. in the following emulsion:

| | Parts |
|---|---|
| Chloroprene | 100 |
| Water | 150 |
| Dispersing agent¹ | 2 |
| Sodium salt of lauryl sulfate | 1 |
| Acetic acid | 0.5 |
| Potassium persulfate | 1.0 |
| Potassium ferricyanide | 0.05 |
| 1-iodo-3-chlorobutene-2 | 0.5 |

¹ Sodium salt of a reaction product of naphthalene, sulfuric acid and formaldehyde.

The polymerization was stopped at 86% product yield by the addition of 2 parts of a 55% N-phenyl-alpha-naphthylamine-45% diphenylamine mixture and 0.1 part of phenthiazine. The latex was coagulated with a mixture of brine and ethyl alcohol, and the polymer was washed and dried on a mill. The plasticity number was 87 and the recovery 2. Milling was good.

Example 5

This illustrates the use of 1-iodo-3-chlorobutene-2 in the polymerization of chloroprene to give a modified polychloroprene latex. Chloroprene was polymerized at 40° C. under a nitrogen atmosphere to a polymer yield of 98% in an emulsion prepared as indicated by the following recipe:

|  | Parts |
|---|---|
| Chloroprene | 100 |
| Water | 100 |
| Nancy wood rosin | 4 |
| Sulfur | 0.01 |
| Sodium hydroxide | 1.056 |
| Potassium persulfate | 0.4 |
| 1-iodo-3-chlorobutene-2 | 0.1 |

The finished latex was compounded as follows:

|  | Parts |
|---|---|
| Latex | 200 |
| Hard clay | 10 |
| Zinc oxide | 5 |
| Phenyl-beta-naphthylamine | 2 |

A dip film was prepared from the compounded latex and cured in air for 15 minutes at 140° C. The 600% modulus (980 lbs. per sq. in.) of this cured film was much lower than that (1525 lbs. per sq. in.) of a similar film from a latex made in the absence of 1-iodo-3-chlorobutene-2, indicating 1-iodo-3-chlorobutene-2 to be an effective modifying agent for polychloroprene latex.

Example 6

A polymer of 75% butadiene-1,3 and 25% styrene was prepared in the following emulsion, using 1-iodo-3-chlorobutene-2 as the essential modifying agent.

|  | Parts |
|---|---|
| Monomer mixture | 100 |
| Water | 180 |
| Rubber reserve soap [1] | 5 |
| Potassium persulfate | 0.5 |
| Dodecyl mercaptan | 0.05 |
| 1-iodo-3-chlorobutene-2 | 0.36 |

[1] Sodium salt of mixed long chain saturated and unsaturated aliphatic acids.

The polymerization was run for 64 hours at 50° C. and then stabilized with 3 parts of a 55% N-phenyl-alpha-naphthylamine/45% diphenylamine mixture. The latex was coagulated with brine and acetic acid and the polymer was washed and dried on a mill.

The polymer was smoother milling and more plasticized than a similar polymer made in the absence of 1-iodo-3-chlorobutene-2.

Example 7

A mixture of butadiene-1,3 (75%) and acrylonitrile (25%) was polymerized in the same system as used in Example 6, except that 1.08 parts of 1-iodo-3-chlorobutene was used as the modifying agent.

The polymer obtained was more plastic and smoother milling than a similar polymer prepared in the absence of 1-iodo-3-chlorobutene-2.

These allylic iodides are effective modifying agents over a wide temperature range, with the preferred temperatures being between 5° and 55° C. They may be employed in amounts varying from 0.10% to 10.0%, based on the weight of the polymerizable materials with which they are incorporated. For the preparation of polymers having good milling properties, the amounts to be used may vary from 0.10% to 2.0%. Where extremely soft and plastic polymers are desired, or where the resulting polymer is to be used in cements of low viscosity and high solids content, as high as 10% of these modifying agents may be used, based on the weight of the polymerizable material with which they are employed. These modifying agents are effective in both alkaline and acid emulsions and also when used alone or when used in combination with other modifying agents such as sulfur or mercaptans.

The allylic iodides may be used as modifying agents in any of the usual polymerization systems, for example, in sodium and other rosinate emulsion systems or where the emulsifying agents are ethylene oxide-higher alcohol condensation products or the alkali salts of sulfonated alkyl alcohols, of fatty acids, or of aliphatic and aromatic sulfonates. If desired, the polymerization may be accelerated by the use of the usual accelerator such as potassium persulfate or other soluble persulfate, benzoyl peroxide, hydrogen peroxide, and the like. These allylic iodides are also effective modifying agents for solution or for massive polymerization of the 1,3-dienes and mixtures thereof with the other polymerizable compounds.

These allylic iodides modify the polymerization of 1,3-dienes such as chloroprene and 1,3-butadiene, and the interpolymerization of such dienes with each other or with mono-olefinic polymerizable compounds which are polymerizable with 1,3-dienes such as styrene or acrylonitrile, acrylates, alkylacrylates, etc. This invention is particularly applicable in the polymerization of 1,3-dienes such as chloroprene, 1,3-butadiene, etc., and in the interpolymerization of mixtures of the same with each other or in mixtures with mono-olefinic polymerizable compounds where the mixture contains at least 50% of the 1,3-diene.

This invention provides modifying agents which do not contain sulfur, making possible the production of sulfur-free elastomers similar to those modified with iodoform. These modifying agents give chloroprene polymers which have improved storage stability, flatter curing range and better resistance to heat aging and to cut growth than sulfur modified polymers. These modifying agents allow more rapid polymerization than an equivalent amount of sulfur, resulting in increased production or in a decrease in the amount of catalyst necessary. In the case of the production of a synthetic latex, this latter effect results in a more stable latex because of lower concentration of electrolytes. A further advantage is that the use of these compounds eliminates the odor often associated with sulfur compounds, and polymers are produced having good working properties.

It is possible with these modifying agents to obtain very plastic polymers for use in cements of low viscosity and high solids content.

I claim:

1. A method for preparing readily processable rubber-like polymers of 1,3-butadiene which comprises carrying out the polymerization of the 1,3-butadiene in an aqueous emulsion and in the presence of from 0.10% to 10.0% of 1-iodo-3-chlorobutene-2, based on the weight of the 1,3-butadiene.

2. A method for preparing readily processable polychloroprene which comprises carrying out the polymerization of 2-chlorobutadiene-1,3 in an aqueous emulsion and in the presence of from 0.10% to 10.0% of 1-iodo-3-chlorobutene-2, based on the weight of the 2-chlorobutadiene-1,3.

3. A method for preparing readily processable poly-chloroprene which comprises carrying out the polymerization of 2-chlorobutadiene-1,3 in an aqueous emulsion and in the presence of from 0.10% to 10.0% of allyl iodide based on the weight of the 2-chlorobutadiene-1,3.

4. A method for preparing readily processable poly-chloroprene which comprises carrying out the polymerization of 2-chlorobutadiene-1,3 in an aqueous emulsion and in the presence of from 0.10% to 10.0% of 1,4-diiodobutene-2 based on the weight of the 2-chlorobutadiene-1,3.

5. A method for preparing readily processable rubberlike polymers of 1,3-butadiene compounds of the group consisting of 2-chloro-1,3-butadiene and 1,3-butadiene which comprises carrying out the polymerization of the monomeric material, which contains at least 50% of the 1,3-butadiene compound, in the presence of from 0.10% to 10.0%, based on the weight of the polymerizable material, of a halogen substituted straight chain unsaturated aliphatic compound selected from the group consisting of the mono-olefine and di-olefine series containing not more than 8 carbon atoms with not more than two halogen atoms in the molecule and not more than one halogen on a single carbon atom, which compound has the nucleus

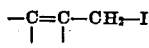

and contains only carbon, hydrogen and halogen of the group consisting of chlorine, bromine and iodine.

6. A method for preparing readily processable rubber-like polymers of 1,3-butadiene compounds of the group consisting of 2-chloro-1,3-butadiene and 1,3-butadiene which comprises carrying out the polymerization of the monomeric material, which contains at least 50% of the 1,3-butadiene compound, in the presence of from 0.10% to 10.0%, based on the weight of the polymerizable material, of a dihalogen straight chain compound selected from the group consisting of the mono-olefine and di-olefine series containing not more than 8 carbon atoms, which compound has the nucleus

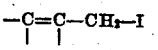

and contains only carbon, hydrogen and halogen of the group consisting of chlorine, bromine and iodine.

7. A method for preparing readily processable rubber-like polymers of 1,3-butadiene compounds of the group consisting of 2-chloro-1,3-butadiene and 1,3-butadiene which comprises carrying out the polymerization of the monomeric material, which contains at least 50% of the 1,3-butadiene compound, in the presence of from 0.10% to 10.0%, based on the weight of the polymerizable material, of a halogen substituted straight chain unsaturated aliphatic compound selected from the group consisting of the mono-olefine and di-olefine series containing not more than 8 carbon atoms with not more than two halogen atoms in the molecule and not more than one halogen on a single carbon atom, which compound has the nucleus

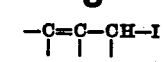

and contains only carbon, hydrogen and halogen of the group consisting of chlorine, bromine and iodine.

8. A method for preparing readily processable rubber-like polymers of 1,3-butadiene compounds of the group consisting of 2-chloro-1,3-butadiene and 1,3-butadiene which comprises carrying out the polymerization of the monomeric material, which contains at least 50% of the 1,3-butadiene compound, in an aqueous emulsion and in the presence of from 0.10% to 10.0%, based on the weight of the 1,3-butadiene compound, of a halogen substituted straight chain unsaturated aliphatic compound selected from the group consisting of the mono-olefine and di-olefine series containing not more than 8 carbon atoms with not more than two halogen atoms in the molecule and not more than one halogen on a single carbon atom, which compound has the nucleus

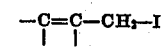

and contains only carbon, hydrogen and halogen of the group consisting of chlorine, bromine and iodine.

9. A method for preparing a readily processable rubber-like polymer of a 1,3-butadiene which comprises carrying out the polymerization of the 1,3-butadiene in the presence of from 0.10% to 10.0%, based on the weight of the 1,3-butadiene, of a halogen substituted straight chain unsaturated aliphatic compound selected from the group consisting of the mono-olefine and di-olefine series containing not more than 8 carbon atoms with not more than two halogen atoms in the molecule and not more than one halogen on a single carbon atom, which compound has the nucleus

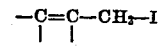

and contains only carbon, hydrogen and halogen of the group consisting of chlorine, bromine and iodine.

10. A method for preparing a readily processable rubber-like polymer of a 1,3-butadiene which comprises carrying out the polymerization of the 1,3-butadiene in an aqueous emulsion and in the presence of from 0.10% to 10.0%, based on the weight of the 1,3-butadiene, of a halogen substituted straight chain unsaturated aliphatic compound selected from the group consisting of the mono-olefine and di-olefine series containing not more than 8 carbon atoms with not more than two halogen atoms in the molecule and not more than one halogen on a single carbon atom, which compound has the nucleus

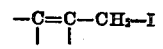

and contains only carbon, hydrogen and halogen of the group consisting of chlorine, bromine and iodine.

11. A method for preparing readily processable polychloroprene which comprises carrying out the polymerization of 2-chlorobutadiene-1,3 in an aqueous emulsion and in the presence of from 0.10% to 10.0%, based on the weight of the 2-chlorobutadiene-1,3, of a halogen substituted straight chain unsaturated aliphatic compound selected from the group consisting of the mono-olefine and di-olefine series containing not more than 8 carbon atoms with not more than two halogen atoms in the molecule and not more than one halogen on a single carbon atom, which compound has the nucleus $$-\underset{|}{C}=\underset{|}{C}-CH_2-I$$

and contains only carbon, hydrogen and halogen of the group consisting of chlorine, bromine and iodine.

GEORGE W. SCOTT.

REFERENCES CITED

The following references are of record in the file of this patent:

UNITED STATES PATENTS

| Number | Name | Date |
|---|---|---|
| 2,066,329 | Carothers | Jan. 5, 1937 |